United States Patent
Schuster et al.

(10) Patent No.: US 6,381,044 B1
(45) Date of Patent: Apr. 30, 2002

(54) METHOD AND APPARATUS FOR CORRECTING ABERRATIONS IN PHOTON COLLECTION DEVICES

(75) Inventors: John J. Schuster, Bellevue; David P. Bajorins, Redmond, both of WA (US)

(73) Assignee: Terabeam Corporation, Kirkland, WA (US)

(*) Notice: Subject to any disclaimer, the term of this patent is extended or adjusted under 35 U.S.C. 154(b) by 77 days.

(21) Appl. No.: 09/627,816

(22) Filed: Jul. 28, 2000

(51) Int. Cl.$^7$ ............................. G02B 5/32; G02B 16/13
(52) U.S. Cl. ............................. 359/16; 359/15; 359/19; 359/708
(58) Field of Search ............................. 359/15, 16, 19, 359/708, 575, 3

(56) References Cited

U.S. PATENT DOCUMENTS 3,778,133 A * 12/1973 Tatian ........................ 359/708
5,471,326 A * 11/1995 Hall et al. .................... 359/15

* cited by examiner

Primary Examiner—Jon Henry
(74) Attorney, Agent, or Firm—Blakely Sokoloff Taylor & Zafman

(57) ABSTRACT

A cover plate on a holographic optical element (HOE) device corrects for aberrations, such as spherical aberrations. The HOE device includes an emulsion material, having a recorded interference pattern that can perform diffraction, sandwiched between a first element and a second element, wherein the second element functions as the cover plate. One of the surfaces of the second element is aspheric to correct for aberrations. The aspheric shape of the surface adds approximately equal and approximately opposite aberrations associated with light rays diffracted by the recorded interference pattern, thereby substantially improving focus.

38 Claims, 3 Drawing Sheets

US 6,381,044 B1

METHOD AND APPARATUS FOR CORRECTING ABERRATIONS IN PHOTON COLLECTION DEVICES

BACKGROUND OF THE INVENTION

1. Field of the Invention

The present invention relates generally to optics, and in particular, relates to an apparatus and method for correcting aberrations in holographic optical elements, such as those used in photon collection devices.

2. Background Information

Holographic optical element (HOE) devices can be used to replace bulky and expensive traditional optical components made of glass and plastics. For example, HOE devices can be designed to perform reflecting (to replace mirrors), beam splitting (to replace beam splitters), and collimating or focusing functions (to replace lenses) in an optical system. Typically, the interference pattern of at least two optical wavefronts is recorded in a photosensitive media to produce the amplitude and/or phase modulation needed for the HOEs. Because HOEs are typically fabricated on/in the thin layer of a photosensitive media on a thin substrate, the weight and size of the elements are greatly reduced compared to their refractive counterparts. The reduced size of optical components enables a more compact optical system package.

Due to the practical complications of recording HOEs at infrared (IR) wavelengths, HOEs are generally recorded at visible wavelengths, thereby leading to spherochromatic aberration effects which dominate performance when playing back spherically constructed HOEs at IR wavelengths. Typically, the exposure geometry used in creating the HOEs results in spherical aberrations or other aberrations, such as astigmatism, chromatic aberration, coma, curvature of field, or distortion during playback. Spherical aberration results in a large spot size at the conjugate and is difficult to correct in extremely fast, space-limited optical systems. Accordingly, there is a need for improvements in the correction of spherical aberrations or other aberrations in optical systems incorporating HOEs.

SUMMARY OF THE INVENTION

According to an aspect of the invention, an apparatus includes a first element having first and second surfaces. The first surface is positionable to face incident light rays. An emulsion material is disposed over the second surface of the first element and has recorded thereon an interference pattern. A second element has a first surface disposed over the emulsion material and has an aspheric second surface to correct aberrations associated with resulting light rays derived from the incident light rays diffracted by the interference pattern.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of an apparatus and method for correcting aberrations in holographic optical element (HOE) devices are described in detail herein. Such corrections are useful in optical systems, for example, that incorporate "off-wavelength" (e.g., recording and playback are at different wavelengths) spherically constructed HOEs. In the following description, numerous specific details are provided, such as the description of a recording process in FIG. 1, to provide a thorough understanding of embodiments of the invention. One skilled in the relevant art will recognize, however, that the invention can be practiced without one or more of the specific details, or with other methods, materials, components, etc. In other instances, well-known material, structures or operations are not shown or described in detail to avoid obscuring aspects of various embodiments of the invention. Furthermore, it is understood that the various embodiments shown in the figures are illustrative representations, and are not necessarily drawn to scale.

Reference throughout this specification to "one embodiment" or "an embodiment" means that a particular feature, material, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, materials, structures, or characteristics may be combined in any suitable manner in one or more embodiments.

As an overview, an embodiment of the invention provides an apparatus for correcting aberrations, such as spherical aberrations, in photon collection devices. Specifically, an embodiment of the invention includes a HOE device having a cover plate, with the cover plate having an aspheric surface that corrects for spherical aberrations. The HOE device may be implemented as part of a receiver device, transceiver device, or other photon collection device in an optical telecommunication system.

Figure 1:
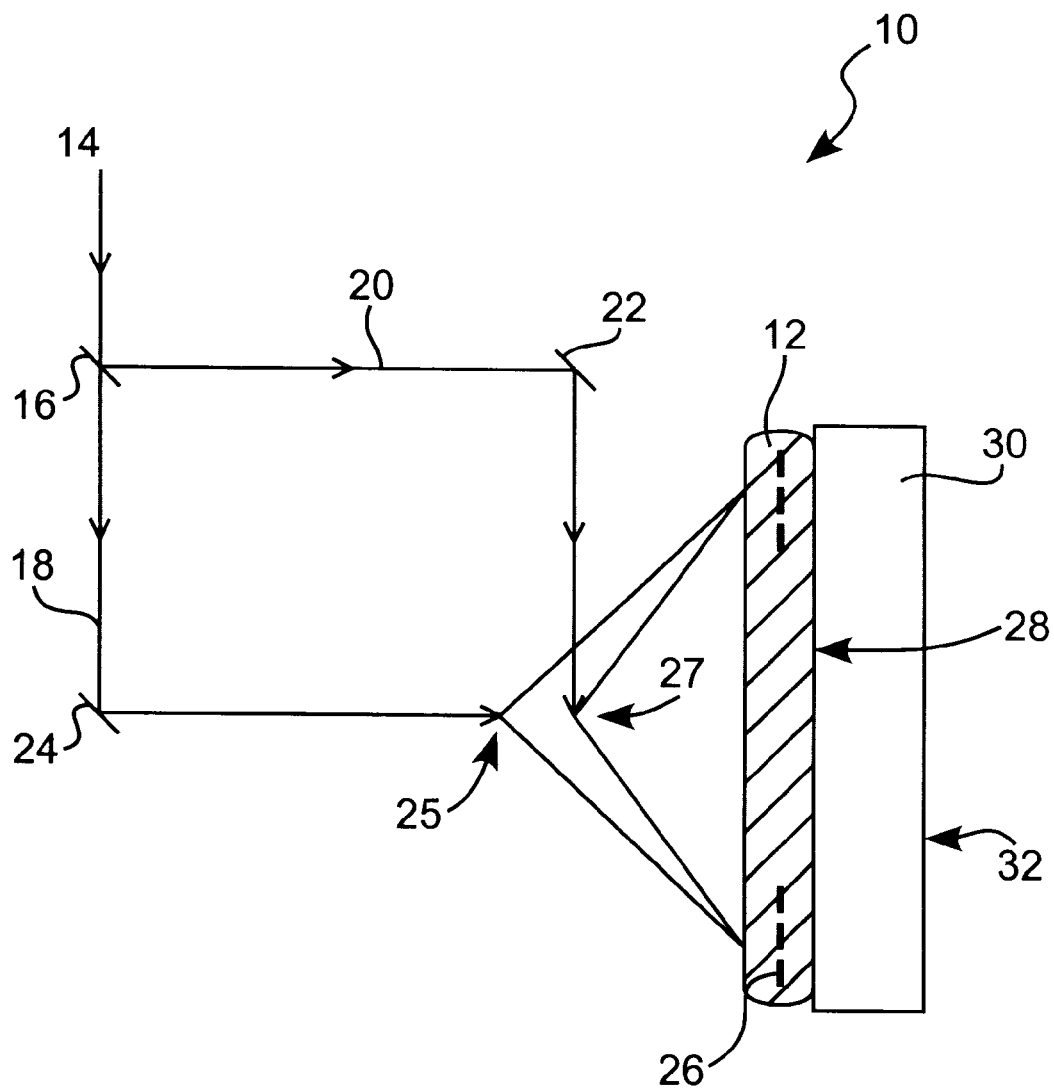
FIG. 1 is a functional block diagram illustrating an embodiment of a recording process for a holographic optical element device.

Referring first to FIG. 1, shown generally at 10 is a process for recording a hologram on an emulsion material 12. The process 10 may occur at a manufacturing stage, for example. A hologram, such as a volume phase hologram in one embodiment, may be recorded by taking a coherent light 14, and splitting the light 14 at a beam-splitter 16 into two light paths 18 and 20. Mirrors 22 and 24 may then be used to direct the light to lenses and/or HOEs to expand the two light paths 18 and 20 onto the surface of the emulsion material 12, from two points 25 and 27, thereby exposing the emulsion material 12 to the interfering light paths 18 and 20.

According to an embodiment, the light 14 used for recording can comprise laser light and the like, having a wavelength of 488 nm, for example. The light 14 is not limited to being monochromatic or to any particular wavelength or color, and may include visible light as well as ultraviolet or infrared portions of the spectrum.

The emulsion material 12 may be made of a photosensitive material such that interference patterns 26, amplitude or phase modulated, resulting from the interfering light paths 18 and 20 are recorded thereon/therein. According to an embodiment of the invention, the emulsion material 12 may comprise dichromated gelatin, though photopolymers that provide a high level of diffraction efficiency for the intended purposes, or can otherwise perform adequately for specific wavelengths, may also be used. A suitable type of gelatin, which can be mixed with dichromate according to ratios known by those skilled in the art, is designed by Ralcon Development Lab, located at Paradise, Utah, and manufactured by Kind & Knox Gelatine, Inc., located at Sioux City, Iowa, under their Gelita™ line of optical gelatins, Type 7644, Lot 2. In other embodiments, the emulsion material 12 can comprise a homogenized mixture of gelatin and silver halides, such as those mixtures that are commercially available for optical applications.

In one embodiment of the process 10, the emulsion material 12, having a thickness of 0.030 mm, for example, may initially be applied to one flat surface 28 of a first element 30. The first element 30 can be, for example, a substrate made from a transparent glass material, so as to reduce scattering effects and/or to improve an incident light signal's transmission efficiency. In other embodiments, the first element 30 may be made from a molded plastic material. Flat surfaces 28 and 32 of the first element 30 may be typically made as smooth as possible, to avoid introducing aberrations during a playback process.

The first element 30 may be circular in shape, although it is not required. The dimensions (e.g., radial length and thickness) of the first element 30 may vary from one situation to another. In one embodiment, the first element 30 may have a diameter of approximately 16 inches and a thickness of 0.236 inches, for example. A person skilled in the art will recognize that many different dimensions for the first element 30 are possible based on various physical and optical criteria, such as type of material used for the first element 30, type of application, coefficient of thermal expansion, index of refraction, dispersive power, etc. According to an embodiment, standard BK-7 glass may be used for the first element 30, with the BK-7 glass having known physical and optical properties. The materials used for the first element 30 can have an index of refraction of approximately 1.5, for example.

After the emulsion material 12 is exposed to the interfering light paths 18 and 20 to record the interference pattern(s) 26, further processing may be performed to complete the recording process. Such further processing is familiar to those skilled in the art, and so is not described in further detail herein. It is noted that although the process 10 has been described in terms of initially applying the emulsion material 12 over the surface 28 of the first element 30 prior to recording, such pre-application is not required. In another embodiment, the emulsion material 12 may first be exposed, and then subsequently applied over the surface 28 of the first element 30. Further, it is possible to perform recordings on multiple units on an array or sheet, such that the individual assemblies comprising the emulsion material 12 and first element 30 need not be processed/recorded one at a time. Additionally, it is possible to record multiple interference patterns on a single assembly comprising the emulsion material 12 and the first element 30. This can be done to incorporate/manipulate phase, wavelength, or angle-varying functions within a HOE of various embodiments of the invention.

Figure 3:
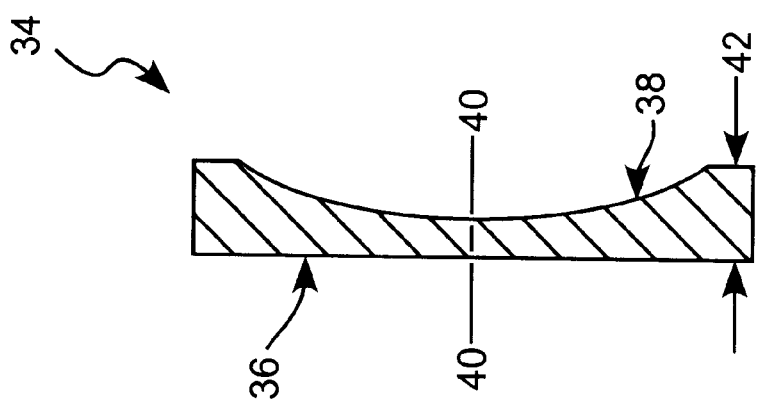
FIG. 3 is a side sectional view of the aspheric surface cover plate of FIG. 2.
Figure 2:
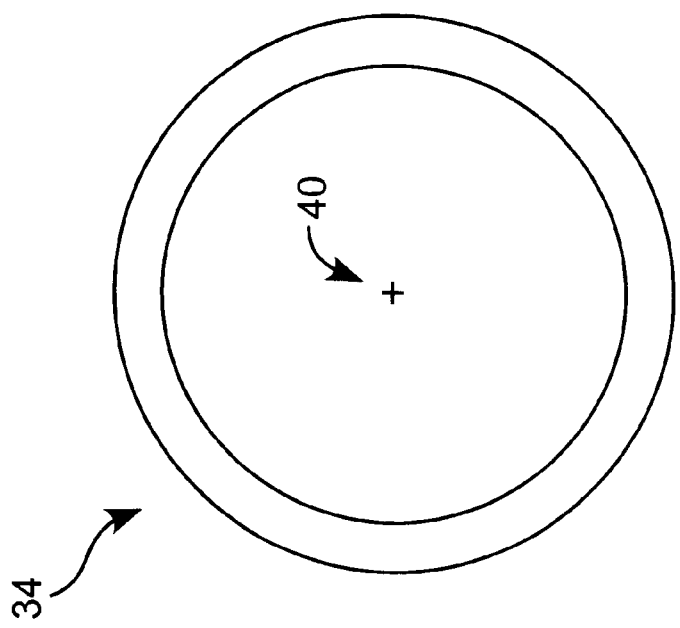
FIG. 2 is a front planar view of an embodiment of an aspheric surface cover plate for the holographic optical element device of FIG. 1.

In an embodiment of the invention, a second element may be disposed over the emulsion material 12 after recording is completed. An example of such a second element, which can function as a cover plate or "cap," is shown at 34 in FIGS. 2–3, where FIG. 2 shows a front planar view and FIG. 3 shows a side sectional view of the second element 34.

As with the first element 30, the second element 34 can be made from a transparent glass material (such as BK-7 glass) or molded plastic material, for example, having the same suitable physical and optical properties (e.g., index of refraction, coefficient of thermal expansion, dispersive power, etc.) as the first element 30. Further, the second element 34 may have a circular shape or other shape that matches the shape of the first element 30.

In an embodiment of the invention, the second element 34 has a substantially flat first surface 36 and an aspheric second surface 38. The first surface 36 may be disposed over the emulsion material 12 (see, e.g., FIG. 4) such that an optical axis 40 of the second element 34 coincides/aligns with an optical axis of the first element 30 and with an optical axis of the recorded diffraction grating (e.g., the interference pattern 26). The first surface 36 of the second element 34 may be bonded or mated flat against the emulsion material 12 after the recording and processing are completed, thereby "sandwiching" the emulsion material 12 between the first element 30 and the second element 34. In this fashion, the second element 34 can protect the emulsion material 12 from deterioration due to moisture absorption and other environmental factors. As described later below, the second element 34 also operates to intrinsically correct aberrations, such as spherical aberrations.

In an embodiment, the aspheric second surface 38 is slumped, ground, diamond turned, or otherwise replicated to fabricate the second element 34 (e.g., to obtain a concave surface having the appropriate aspheric surface sag), prior to mating the second element 34 with the emulsion material 12. Furthermore, a suitable anti-reflection coating may be applied to one or both surfaces 36–38 prior to mating the second element 34 with the emulsion material 12. A suitable adhesive having a thickness of 0.100 mm, for example, may be used to affix the second element 34, where the adhesive is index-matched to the emulsion material 12 and is transparent to the playback wavelength. All surfaces are typically made as smooth as possible to avoid introducing aberrations.

According to an embodiment of the invention, the second element 34 may have a diameter of 16 inches, for example, and it is understood that the diameter can vary from one application to another, depending on factors such as type of implementation, assembly dimensions of optical equipment, type of material used for the second element 34, etc. The second element 34 may have a center thickness, at non-beveled surfaces 42, of 0.236 inches, for example, and again it is understood at the thickness at this region may vary from one application to another.

In an embodiment of the invention, the aspheric second surface 38 of the second element 34 has an incrementally changing radius, while other embodiments may have radii that change in a substantially contiguous manner. The appropriate incremental radius may vary from one application to another, and can be determined by a person skilled in the art. For example, if a diameter and a designed effective focal length (EFL) for the second element 34, as measured along the optical axis 40 from the aspheric second surface 38 to a focal point 44 (see, e.g., FIG. 4), are known, then sag tables or aspheric deformation coefficients may be used to determine the appropriate incremental radii along the aspheric second surface 38. If the degree, sign, and order of spherical aberration is known, such as the amount of overcorrection (e.g., positive spherical aberration) or undercorrection (e.g., negative spherical aberration), then lens design software may be used to determine a sag table of the aspheric second surface 38, such that an image may be properly focused on the focal point 44. Such methods are not described in further detail herein because they would be familiar to those skilled in the art having the benefit of this disclosure.

Figure 4:
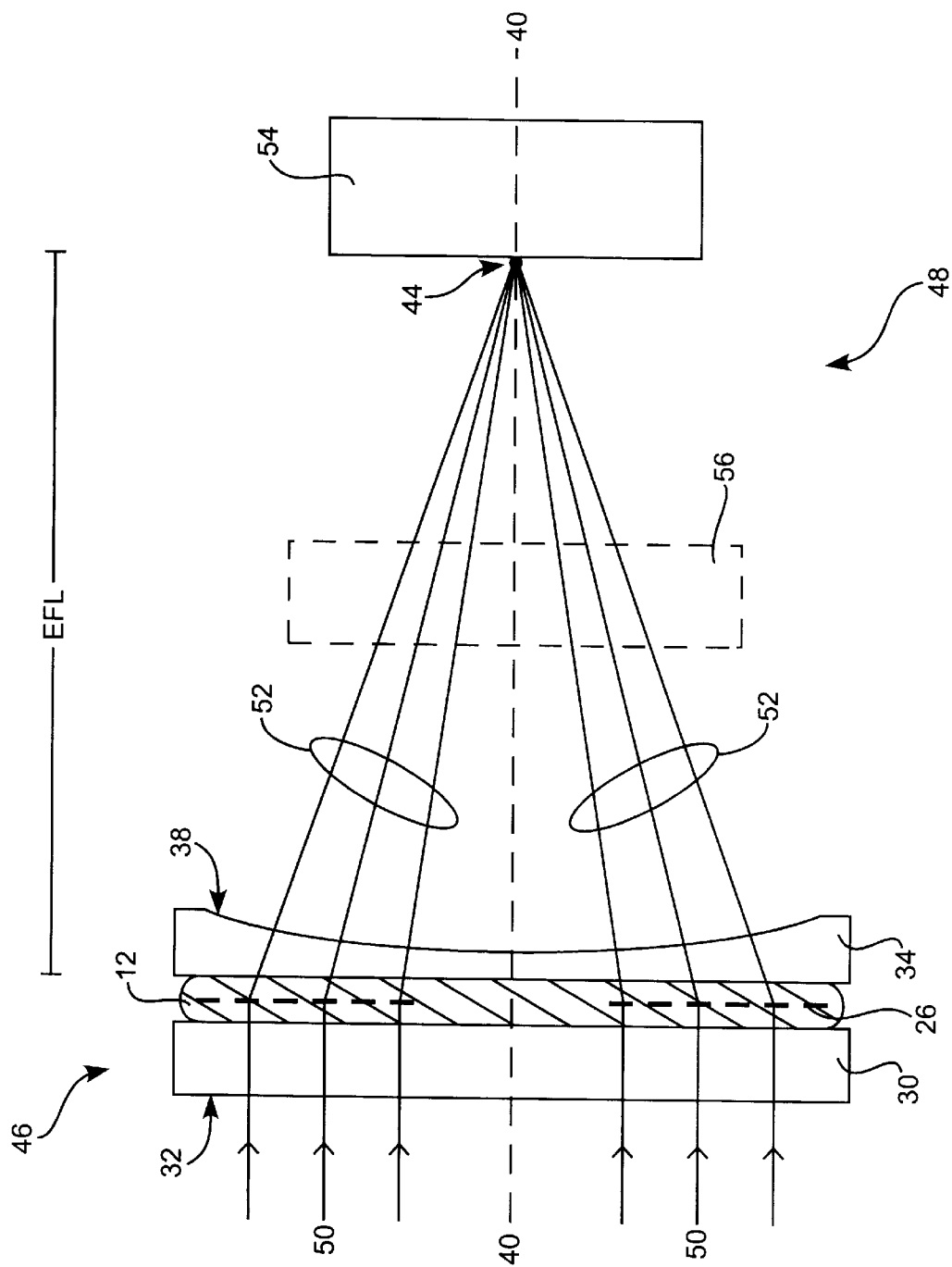
FIG. 4 is a functional block diagram illustrating operation of the holographic optical element device of FIG. 1 and of the aspheric surface cover plate of FIGS. 2–3 during a playback process.

FIG. 4 is a functional block diagram illustrating operation of a HOE device 46 during playback, wherein the HOE device 46 comprises the first element 30, emulsion material 12 having a recorded interference pattern, and the second element 34. This playback may occur during a reception of transmitted (e.g., incident) light signals 50 having modulated data, where the light signals 50 have a wavelength of 1548.51 nm in one embodiment. That is, the HOE device 46 may comprise part of an optical telecommunication receiver, transceiver, or similar optical unit 48. Specific examples of units 48 that use HOE devices may be found in a co-pending patent application entitled "System and Method for Using a Holographic Optical Element in a Wireless Telecommunication System Receiver," U.S. patent application Ser. No. 09/627,815, filed Jul. 28, 2000, and incorporated by reference.

Briefly summarizing, the flat surface 32 of the first element 30 is oriented to face the incident light rays 50 that carry modulated data. The incident light rays 50 pass unchanged through the first element 30 and are then modified/diffracted by the recorded interference pattern 26 into the second element 34. The light rays 52 pass through the second element 34 and through its aspheric second surface 38, which corrects aberrations so that the resulting light rays 52 can be properly focused at the focal point 44 along the optical axis 40.

As illustrated in FIG. 4, the second element 34 can correct spherical aberrations through the use of the aspheric second surface 38. A HOE device constructed with on-axis point sources typically exhibits high amounts of over-corrected spherical aberration when played back at a wavelength other than which it was constructed. In other words, rays passing through outer zones of an unpowered/flat second element will have longer focal lengths than rays passing through inner zones of the unpowered/flat second element. By incorporating the second element 34 having the aspheric second surface 38, upon playback, the second element 34 intrinsically adds under-corrected spherical balancing to reduce the over-corrected spherical aberration, thereby improving performance. That is, the aspheric contour of the second surface 38 causes a reduction of the focal lengths of rays passing through the outer zones of the second element 34, which results in these rays properly focusing at the focal point 44 instead of at adjacent regions. Stated in another way, the aspheric second surface 38 of the second element 34 is shaped to add approximately equal and approximately opposite aberrations, thereby substantially improving focus.

The unit 48 includes an optical processing unit 54 that can use mirrors, lenses, photo detectors, electronic circuitry, processors, software, etc. to retrieve the modulated data from the resulting light rays 52. The unit 48 may include mirrors or beam splitters, collectively shown as a unit 56, such that the resulting light rays 52 need not be directly incident on the optical processing unit 54 at the focal point 44. Rather, the unit 56 can perform various redirection and refocusing operations on the light rays 52 in a manner described in the copending patent application identified above to achieve certain results. The determination of the EFL based on various factors, such as playback and construction wavelength, are also described in the copending patent application, and are not described in further detail herein.

Although spherical aberrations are described herein as a type of aberration that can be corrected by the second element 34, it is to be appreciated that other types of aberrations may be corrected as well. One skilled in the art will recognize that principles of an embodiment of the invention may be applied to correct astigmatism, coma, or distortion, where correction may be achieved through proper shaping, aperture stop placement, and contouring of surfaces of the second element 34. For instance, depending on the placement of an aspheric surface, correction of these other types of aberrations can be achieved by using binary zone plates, phase gratings, blazed transmission zone plates, computer-generated holograms, Lohmann holograms, Kinoforms, or other diffractive elements.

An advantage of an embodiment of the invention is that by correcting for the aberration(s) at the second element 34, optical components (e.g., the units 54 and 56) after the HOE device 46 can be greatly simplified. This is because the reduced or eliminated aberration in the resulting light rays 52 can be focused to a smaller region. Additionally, the simplified optical components will be considerably easier to align and will be considerably less sensitive to small changes in alignment due to thermal expansion or assembly errors. This reduction in complexity of the optical components and assembly tolerances will greatly reduce overall costs of the unit 48.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, instead of making the second surface 38 of the second element 34 aspheric, it is possible to provide an embodiment that has an aspheric surface 32 for the first element 30, where the surface 32 is convex (e.g., curved outwardly to face the incident light rays 50).

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a first element having first and second surfaces, the first surface being positionable to face incident light rays;
   an emulsion material disposed over the second surface of the first element having recorded thereon an interference pattern; and
   a second element having a first surface disposed over the emulsion material and having an aspheric second surface to correct aberrations associated with resulting light rays derived from the incident light rays diffracted by the interference pattern, the interference pattern being recorded to converge the light rays that it diffracts.

2. The apparatus of claim 1 wherein the aspheric second surface is shaped to correct spherical aberrations to substantially improve focus by addition of approximately equal and approximately opposite aberrations.

3. The apparatus of claim 1 wherein the first and second elements are made from a glass material.

4. The apparatus of claim 1 wherein the second element is made from a transparent molded plastic material.

5. The apparatus of claim 1 wherein the emulsion material comprises dichromated gelatin.

6. The apparatus of claim 1 wherein the emulsion material comprises a photopolymer material.

7. The apparatus of claim 1 wherein the first surface of the second element is bonded to the emulsion material by an adhesive material that is indexed-matched to the emulsion material.

8. The apparatus of claim 1 wherein first element is structured to pass the incident light rays to the interference pattern, the interference pattern being capable to diffract the passed incident light rays into the second element and on towards a location facing the aspheric second surface of the second element to substantially improve focus of the resulting light rays.

9. The apparatus of claim 8 wherein the location facing the aspheric second surface of the second element comprises a location along an optical axis of the second element.

10. The apparatus of claim 1 wherein the aspheric second surface comprises a concave surface.

11. The apparatus of claim 1 wherein the first and second surfaces of the first element are substantially flat.

12. The apparatus of claim 1 wherein first and second elements have an index of refraction between 1.4 and 2.50.

13. The apparatus of claim 1 wherein the first and second elements have a diameter between 6 and 48 inches and have thicknesses between 0.1 and 0.4 inches.

14. An apparatus, comprising:
an element made from a transparent material to pass light rays and having a substantially flat first surface and an aspheric second surface, the first surface being positionable to face light rays diffracted by an interference pattern recorded to converge light rays that it diffracts, the aspheric second surface being shaped to correct aberrations associated with the light rays convergently diffracted by the interference pattern.

15. The apparatus of claim 14 wherein the light rays include data modulated thereon.

16. The apparatus of claim 14 wherein the transparent material comprises a glass material.

17. The apparatus of claim 14 wherein the aspheric second surface comprises a concave surface, the element having a dimensional thickness that increases as a distance along the concave surface, from a focal axis of the element, increases.

18. The apparatus of claim 14 wherein the aspheric second surface is shaped to correct a spherical aberration associated with the light rays diffracted by the interference pattern by addition of approximately equal and approximately opposite aberrations.

19. An apparatus, comprising:
a first element having first and second surfaces, the first surface being positionable to face incident light rays;
an emulsion material disposed between the first element and a first surface of a second element, the emulsion material having recorded thereon an interference pattern, the interference pattern being recorded to converge light rays that it diffracts; and
an aspheric component to correct aberrations associated with resulting light rays derived from the incident light rays diffracted by the interference pattern.

20. The apparatus of claim 19 wherein the aspheric component comprises an aspheric second surface of the second element.

21. The apparatus of claim 19 wherein the aspheric component comprises an aspheric first surface of the first element.

22. The apparatus of claim 19 wherein the aspheric component is shaped to correct a spherical aberration to substantially improve focus by addition of approximately equal and approximately opposite aberrations.

23. A system, comprising:
a holographic optical element (HOE) device having:
a first element having first and second surfaces, the first surface being positionable to face incident light rays;
an emulsion material disposed over the second surface of the first element having recorded thereon an interference pattern, the interference pattern being recorded to converge light rays that it diffracts; and
a second element having a first surface disposed over the emulsion material and having an aspheric second surface to correct aberrations associated with resulting light rays derived from the incident light rays diffracted by the interference pattern; and
an optical processing unit positionable to receive the resulting light rays from the HOE device and to process data modulated on the light rays.

24. The system of claim 23 wherein the optical processing unit includes a photodetector positionable at a location facing the aspheric second surface of the second element to detect the resulting light rays, wherein the location comprises a location along an optical axis of the second element.

25. The system of claim 23 wherein the HOE device and the optical processing unit comprise part of a receiver unit for an optical telecommunication system.

26. The system of claim 23 wherein the aspheric second surface is shaped to correct a spherical aberration to substantially improve focus by addition of approximately equal and approximately opposite aberrations.

27. A method, comprising:
applying an emulsion material over a first surface of a first element having first and second surfaces;
recording an interference pattern on the emulsion material, in a manner that the recorded interference pattern can diffract light rays in a convergent direction;
providing an aspheric component useable to correct aberrations; and
bonding a first surface of a second element having first and second surfaces to the emulsion material having the recorded interference pattern.

28. The method of claim 27 wherein providing the aspheric component comprises shaping an aspheric profile into the second surface of the second element prior to bonding the first surface of the second element to the emulsion material.

29. The method of claim 27 wherein bonding the first surface of the second element to the emulsion material includes using an adhesive material for the bonding.

30. The method of claim 27, further comprising placing an anti-reflective coating on the second surface of the second element.

31. The method of claim 27, further comprising recording multiple interference patterns on an assembly comprising the emulsion material and the first element.

32. The method of claim 27 wherein providing the aspheric component comprises shaping an aspheric profile on the second surface of the first element.

33. A method, comprising:
receiving incident light rays;
passing the incident light rays to a recorded interference pattern; and
correcting an aberration associated with light rays that result from the incident light rays by using an aspheric component.

34. The method of claim 33 wherein the aspheric component comprises an aspheric surface through which pass light rays derived from the incident light rays diffracted by the recorded interference pattern.

35. The method of claim 33 wherein correcting the aberration associated with the incident light rays by using the aspheric component comprises adding approximately equal and approximately opposite aberrations to substantially improve focus.

36. The apparatus of claim 1 wherein the incident light rays include data modulated thereon.

37. The apparatus of claim 1 wherein the incident light rays include data modulated thereon.

38. The method of claim 33 wherein the incident light rays include data modulated thereon.

\* \* \* \* \*